UNITED STATES PATENT OFFICE 2,317,130

POLYMERIZABLE UNSATURATED METHYLENE COMPOUND AND RESIN COMPRISING POLYMERS THEREOF

Loring Coes, Jr., Brookfield, and Carl E. Barnes, Worcester, Mass., assignors, by mesne assignments, to E. I. du Pont de Nemours & Company, Wilmington, Del., a corporation of Delaware No Drawing. Application February 28, 1939, Serial No. 258,958

4 Claims. (Cl. 260—83)

This invention relates to polymerizable unsaturated methylene compounds and resins comprising polymers thereof.

Various polymerizable unsaturated methylene compounds containing the group

in which R may be hydrogen or a methyl group, such as methyl methacrylate, polymerize to form transparent bodies, but they may have the wrong index of refraction or dispersion value or lack other characteristics desired for making optical bodies, such as lenses. It is, however, feasible to modify the properties of such polymerized base substances by the addition of a suitable agent before polymerization thereof, and particularly by polymerizing a selected base substance in the presence of a polymerized or polymerizable modifying agent having the required optical properties and capable of forming an optical body therewith.

We have discovered that methacryl aniline, heretofore made in the monomeric form, may be polymerized and made to serve as a modifying agent to vary the refractive index and other properties of such base substances. We have also discovered that other and hitherto unknown acrylic and methacrylic acid derivatives of the aromatic amines may be made as monomeric substances and polymerized to form useful resins by themselves, and that these polymers will also serve as modifying agents for other polymerized unsaturated methylene compounds and particularly for making transparent resins capable of use as optical bodies.

One object of the invention is therefore to provide optical bodies of required characteristics by modifying the properties of suitable base substances by means of such polymerizable derivatives.

Further objects are to provide new and useful monomeric and polymeric acrylic and methacrylic acid derivatives of the aromatic amines, and to provide polymerizable substances which are capable of forming useful resins and of serving as modifying agents for other polymers.

A still further object is to make a resin of a polymerized unsaturated methylene base substance modified by a polymerizable, aromatic amine derivative which is capable of providing required optical properties, together with a further polymerizable substance which imparts desired physical properties thereto. Further objects will be apparent in the following disclosure.

In accordance with one phase of our invention, we propose to make the monomeric acrylic and methacrylic acid derivatives of various aromatic amines capable of polymerization, such as the ortho-, meta- and para-phenylene diamines, ortho-, meta- and para-touIidines, toluylene di amine, alpha and beta naphthylene amines, naphthalene diamines, amino derivatives of diphenyl, as well as other primary or secondary aromatic amines. Another phase of this invention resides in the polymerization of such monomers and the formation of synthetic resins of useful properties. A further feature is the formation of resins of particular use as optical bodies, by polymerizing various unsaturated methylene compounds serving as base substances, defined below, with methacryl aniline and the other acrylic and methacrylic acid derivatives of the amines.

These derivatives may be made from numerous amines capable of forming useful polymers. As an example, we maqe make a polymerizable substance from ortho-phenylene diamine, such as the di-N-methacryl derivative thereof, which is considered to have the structural formula

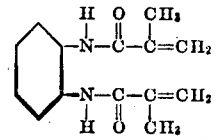

As an example of the secondary aromatic amines of the above group, we may use N-alkyl or N-aryl aromatic amines, such as N-methyl aniline or N-phenyl aniline.

These compounds may be made by the same general procedure. For example, the di N-methacryl derivative of ortho-phenylene diamine may be made by gradually adding 25 grams of ortho-phenylene diamine to 80 cc. of methacrylic anhydride, with cooling. After all of the amine has dissolved, the solution is allowed to stand at room temperature for two hours and then poured into water. The precipitate may then be filtered off and recrystallized from methyl alcohol. The product as thus made crystallizes from methyl alcohol as colorless transparent needles and has a melting point of 124° C. It polymerizes to form a hard brittle transparent resin having a refractive index of 1.61. The monomeric substance analyzes to give 11.34% of nitrogen, whereas the calculated amount according to the formula is 11.49.

The various monomeric substances of the above group are capable of polymerizing with the aid of heat and if desired, a catalyst, such as benzoyl peroxide, to form transparent resins. These substances are particularly useful for the purpose of modifying the refractive index and other properties of various base substances selected from the group of the polymerizable unsaturated mono-methylene compounds, when they are interpolymerized from a mixture of the monomeric liquids.

Suitable base substances capable of being used with these polymerizable amine derivatives are:

1. Derivatives of acrylic acid and methacrylic acid, such as their esters, amides and halides.
2. Vinyl esters.
3. Polymerizable substituted ethylenes.
4. Mono-vinyl and substituted mono-vinyl ketones.
5. Mono-vinyl ethers.
6. Mono-vinyl and substituted mono-vinyl aldehydes.

While many other base substances may be used within the scope of our invention, the following are given as examples of those substances in the above groups which are usable with our modifying agents:

1. The esters of acrylic acid and methacrylic acid comprise methyl, ethyl, isopropyl and terbutyl acrylates and methacrylates and other alkyl esters of these acids, as well as the mono esters of the polyhydric alcohols. They also comprise aryl esters, such as phenyl or benzyl acrylate or methacrylate or paracyclohexylphenyl acrylate or methacrylate. Acryl and methacryl amides and chlorides may also be used.
2. The vinyl esters comprise vinyl acetate, propionate, butyrate, etc.
3. The preferred substituted ethylenes are styrene, furyl ethylene, vinyl chloride and nitroethylene.
4. The preferred ketones comprise methyl vinyl ketone and isopropenyl methyl ketone.
5. The mono-vinyl ethers comprise methyl vinyl ether, phenyl vinyl ether and similar substances.
6. Examples of the aldehydes are acrolein and alpha methyl acrolein.

Useful interpolymers may be made from any one of these base substances with any one of the modifying agents which we have discovered, as well as with methacryl aniline, and we may choose any base substance and any modifying agents of these above groups which are compatible with one another and which are proportioned in miscible amounts so that they may be copolymerized with molecules of both substances in the same chain. Also, for certain purposes, we may first polymerize one substance and then polymerize the other in its presence, provided the previously polymerized substance is soluble in the other in both its monomeric and polymeric form.

As an example of this phase of our invention, methyl methacrylate copolymerized with 25% of methacryl aniline forms a resin of high transparency having a refractive index of about 1.52. The copolymer has a Rockwell hardness of 69 as compared with a hardness of about 30 to 35 for the commercial methyl methacrylate. Hence, these two substances may be used in various proportions to give different refractive indices and/or hardness characteristics varying between those of the two chosen materials, depending upon the proportions used. The refractive index is proportional to the amount of modifying agent used. For example, the index of methyl methacrylate is about 1.49 and the index of methacryl aniline is about 1.615; hence these vary by 0.125 so that each 10% of methacryl aniline employed will give an increase of index of about 0.0125 over that of the methyl methacrylate. The other optical properties of the body may be likewise varied. It will be noted that the dispersion of the single polymerized modifying agent, or of the copolymer therewith with one of the base substances, is materially different from that of a silicate glass having the same refractive index. Hence, by a suitable choice of materials in these two groups, one may produce a body having a chosen index and a desired dispersion value; and at the same time the hardness characteristics of the body may be suitably modified by copolymerization with a cross linking agent or hardness improving polymer as herein defined.

The acrylic and methacrylic acid derivatives of the poly-amines contain a plurality of the unsaturated methylene groups and thereby are capable of acting as cross linking agents when interpolymerized with the mono-methylene compounds used as base substances. Hence these poly-methylene compounds may serve to increase the hardness or to decrease the solubility or to raise the softening point of the resin formed of the linear chain base substance when interpolymerized therewith. The mono-amines contain only a single $=CH_2$ group and polymerize only in linear chain formation, hence they may be used to modify the refractive index without materially affecting the solubility, hardness or fusibility of the resin; while the polymethylene compounds may be employed to change the index as well as to modify these other physical characteristics.

As further hardness modifying agents, we may use any polymerizable substance comprising a cross linking agent or a polar compound or other group which will impart desired characteristics to the copolymer. The cross linking agents are those compounds containing two or more polymerizable unsaturated methylene groups per molecule which are compatible and miscible with the base substance and are capable of copolymerizing therewith. Examples of such cross linking agents are the polyhydric alcohol esters of acrylic and methacrylic acids, also the anhydrides, nitriles, and vinyl, allyl and substituted allyl esters of these acids. Examples of the polyhydric alcohols are the hypothetical ethylidene glycol, ethylene glycol, glycerol, pentaglycerol, and various other polyhydric alcohols capable of forming esters with these acids and their homologues. Other desirable cross linking agents are divinyl benzene and divinyl ketone and homologues.

We may also use a modifying agent which improves the hardness characteristics of the body due to the presence of polar substituents, such as carboxyl or amino groups. For example, acrylic acid and methacrylic acid are believed to act as if the carboxyl groups in adjacent chains attract each other, thus raising the softening point and increasing the hardness of the copolymer.

Hence, we may choose an amine derivative to give a proper index of refraction and, if the hardness is not right for a given purpose, this may be improved by the use of a further modifying agent, although many of the amine derivatives increase the hardness to some extent.

By a suitable choice of base substance, index modifying agent and hardness improving agent, we may make copolymers of various utilities in the optical and other fields. These substances may be mixed together in their monomeric form in miscible proportions and wherein the amounts selected give the properties desired. The mixture may then be subjected to heat and with or without a catalytic agent to form the resin.

If an optical body is to be made, the proportions of the mixture are to be such as to form one which is not cracked or so full of strains that it may crack during use and which may be shaped under pressure by a high temperature molding operation or which may be cast to a rough shape and thereafter ground and polished by a standard optical grinding operation to provide a true optical surface. A resin which has become cracked or is otherwise so imperfect that it will not transmit light properly to form a clear optical image is of little value in the optical field and the substances are, therefore, to be proportioned to form a useful body.

It will be understood that the above description of this invention is to be considered as illustrative of the general principles as well as specific applications thereof and that it is not to be construed as limitations thereon except as defined in the following claims.

We claim:

1. Ortho-phenylene diamine in which both of the amino groups contain as a substituent the

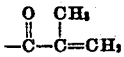

group.

2. A synthetic resin obtained by polymerizing ortho-phenylene diamine in which both of the amino groups contain as a substituent the

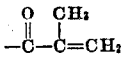

group.

3. An aromatic diamine from the group consisting of the phenylene, toluylene, diphenyl, and naphthalene diamines, in which all of the amino groups contain as a substituent a group from the class consisting of

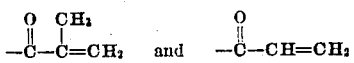

groups.

4. A synthetic resin obtained by polymerizing an aromatic diamine from the group consisting of the phenylene, toluylene, diphenyl, and naphthalene diamines, in which all of the amino groups contain as a substituent a group from the class consisting of

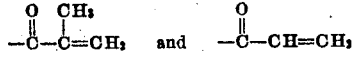

groups.

LORING COES, Jr.
CARL E. BARNES.